Feb. 9, 1971 R. W. KING 3,561,894
INTAKE CHARGE COOLING SYSTEM FOR ROTARY MACHINE
Filed April 7, 1969 4 Sheets-Sheet 1
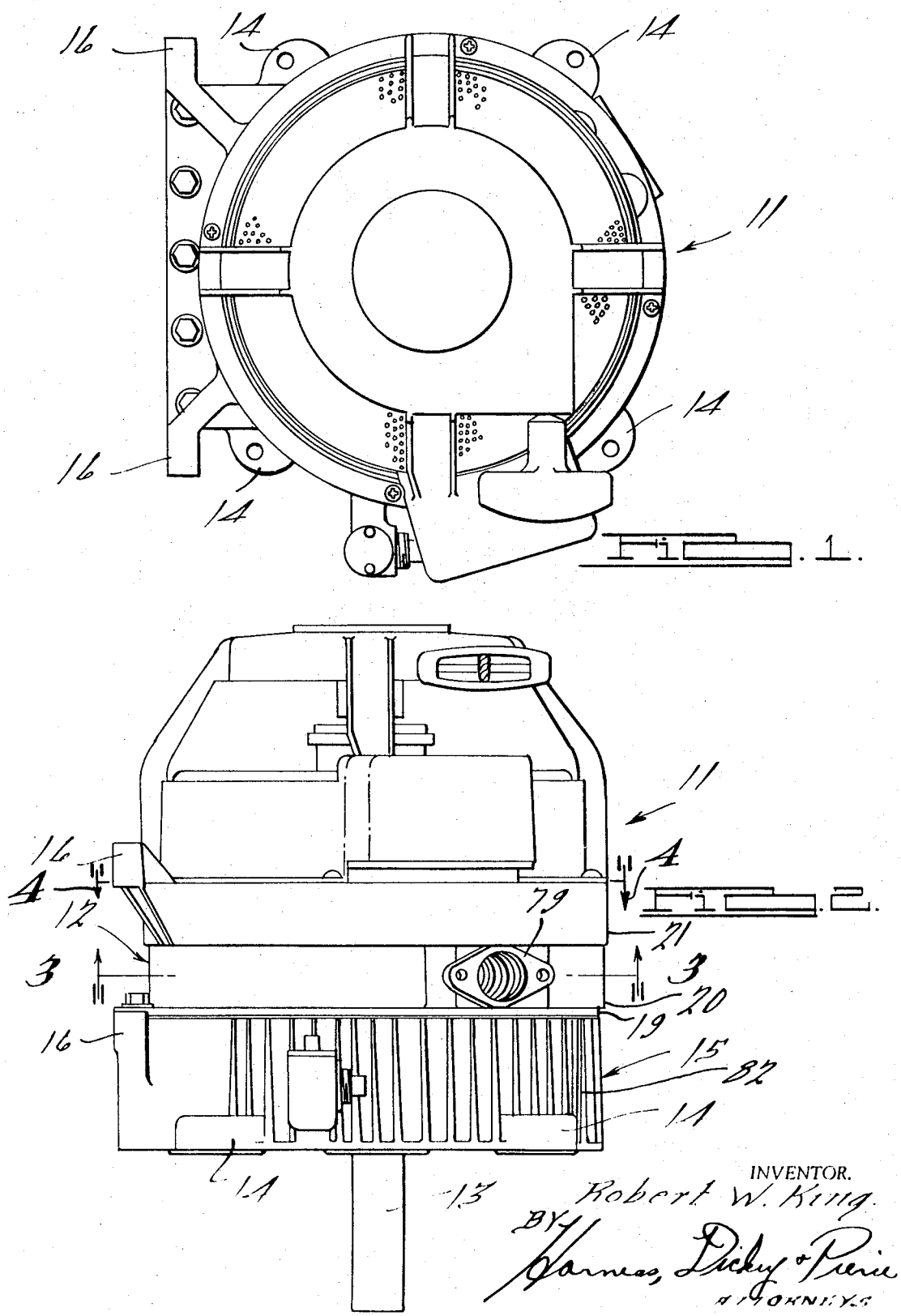
INVENTOR.
Robert W. King

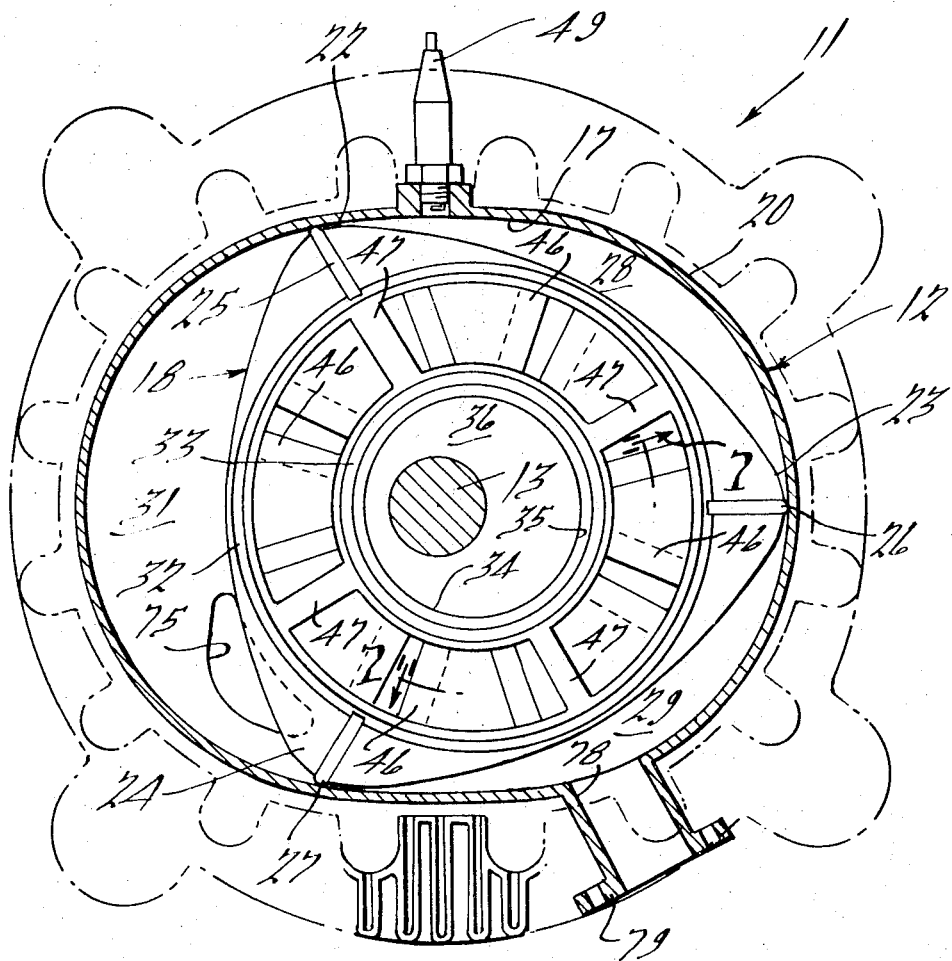
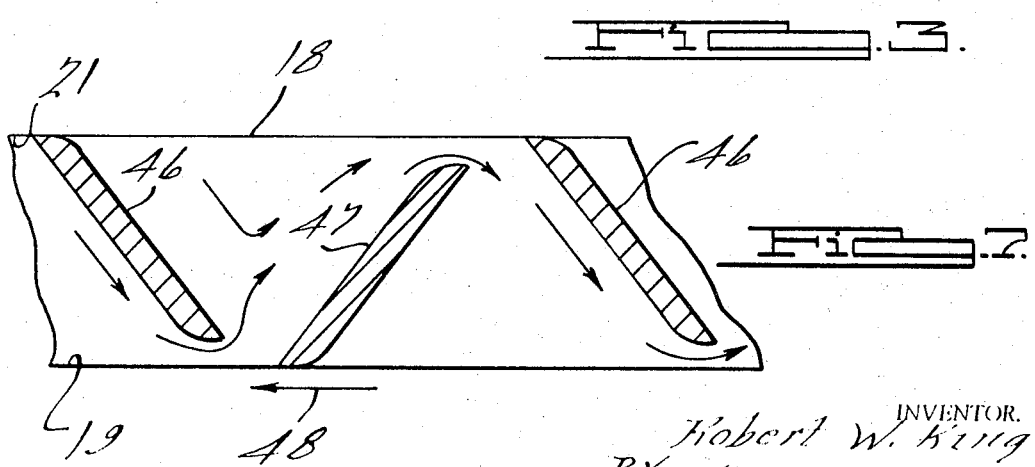

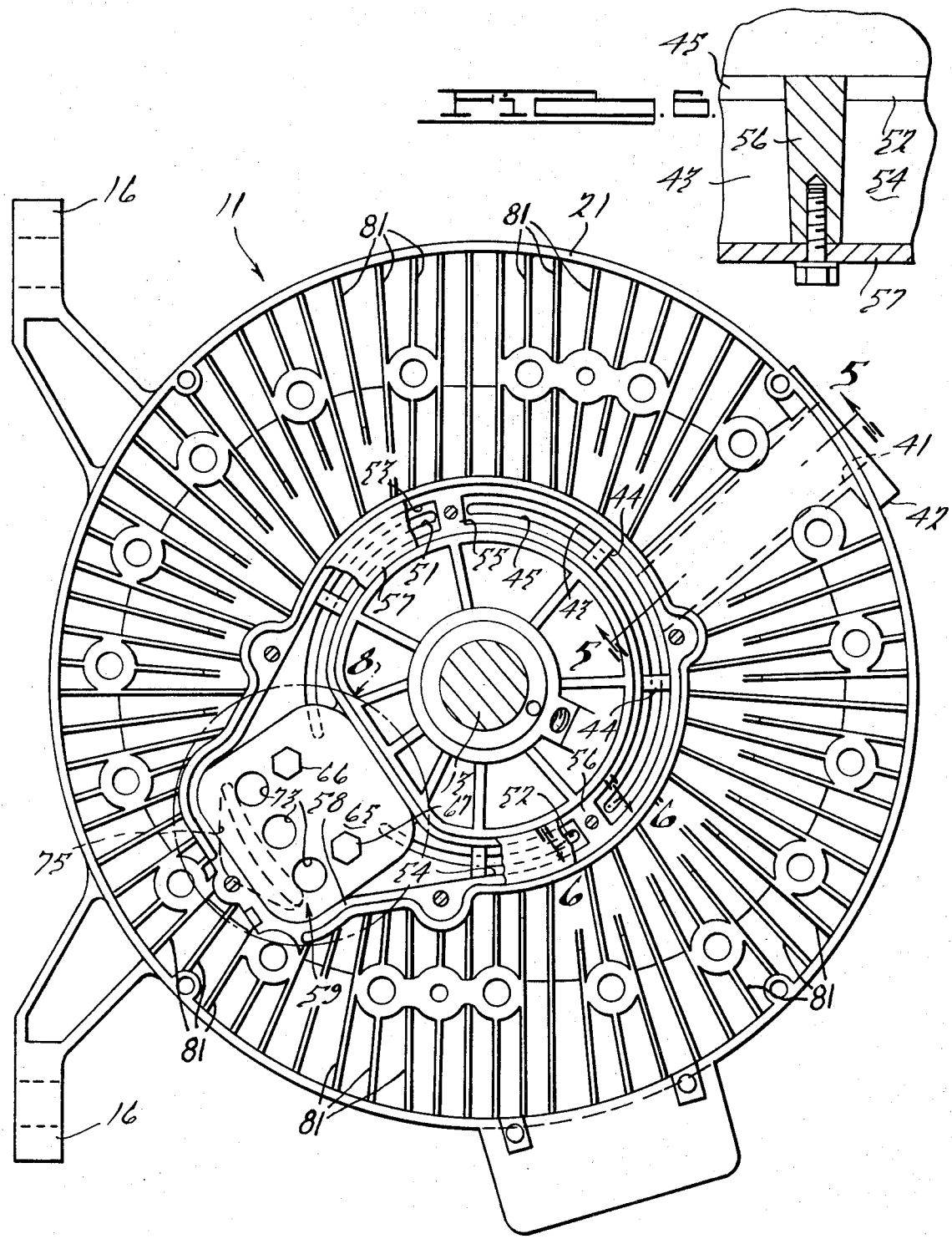

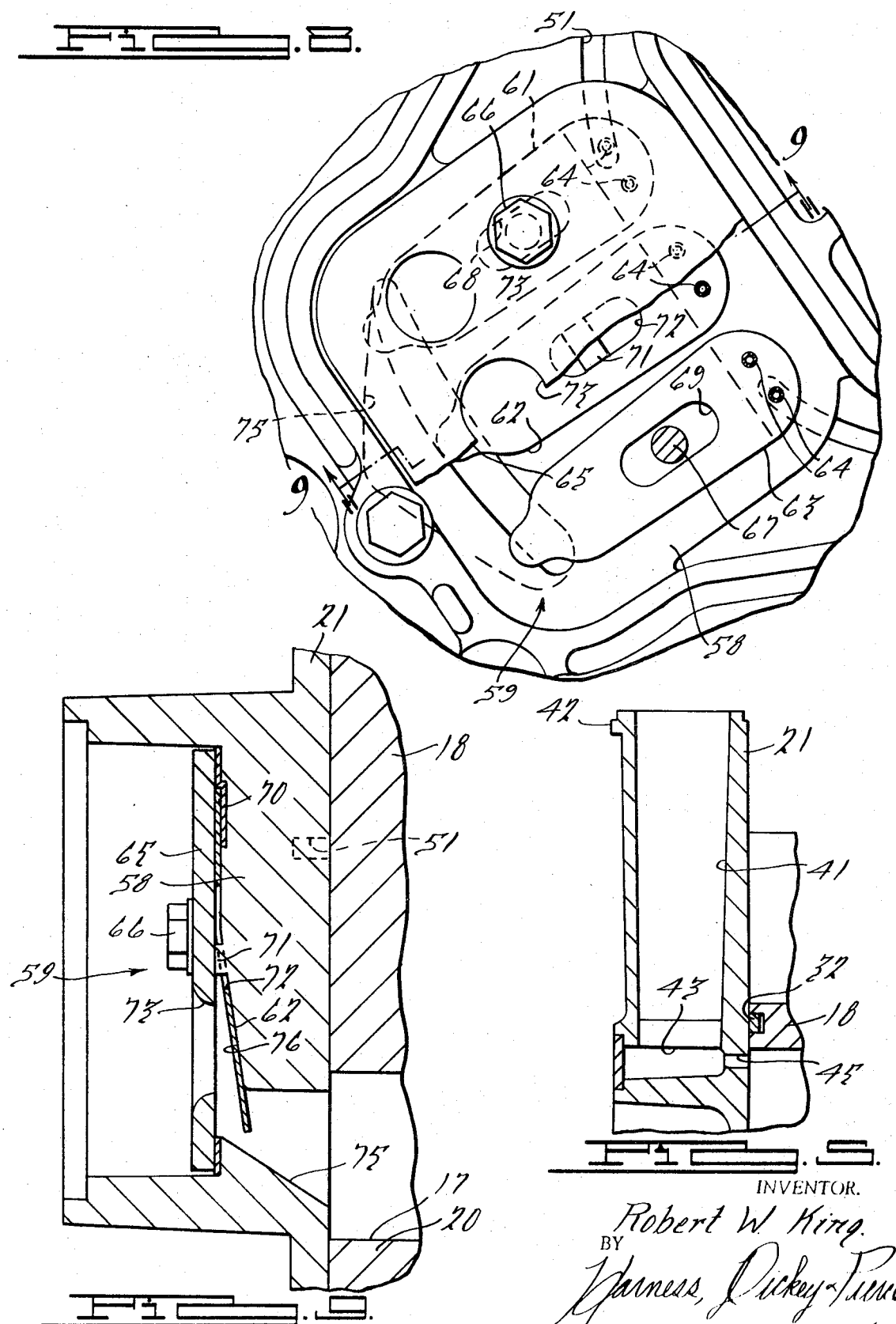

United States Patent Office 3,561,894
Patented Feb. 9, 1971

3,561,894
INTAKE CHARGE COOLING SYSTEM FOR ROTARY MACHINE
Robert W. King, Sidney, Ohio, assignor to Copeland Refrigeration Corporation, a corporation of Michigan
Filed Apr. 7, 1969, Ser. No. 813,881
Int. Cl. F02b 55/06
U.S. Cl. 418—86                    5 Claims

ABSTRACT OF THE DISCLOSURE

An air cooled rotary piston internal combustion engine. A portion of the engine cooling is effected by passing the induction charge through a hollow, vaned rotor before induction into the combustion portion of the engine.

BACKGROUND OF THE INVENTION

This invention relates to a cooling arrangement for a rotary piston internal combustion engine and more particularly to a means for air cooling the rotor of the engine.

The advantages of rotary engines and particularly the rotating piston type of engine are well known. One problem associated with this type of engine that has limited its commercial application is the uneven heat generation of the engine. Unlike a conventional reciprocating engine, the area wherein combustion occurs does not normally undergo a cooling cycle. Since the rotor moves relative to the outer housing and to its supporting eccentric, it has been difficult to cool the rotor. Although various cooling arrangements have been proposed, the prior proposals are not completely satisfactory.

It is, therefore, a principal object of this invention to provide an improved cooling arrangement for a rotary piston internal combustion engine.

It is another object of this invention to provide an improved rotor cooling arrangement for such an engine.

It is yet another object of the invention to provide an air cooling system for such an engine.

SUMMARY OF THE INVENTION

A cooling arrangement embodying this invention is particularly adapted for cooling a rotating piston internal combustion engine. Such an engine has an outer housing defining a cavity in which a rotor is positioned. Means on the rotor engage the outer housing and divide the cavity into at least two chambers. The outer housing and rotor are supported for relative rotation whereby the chambers vary in volume. An internal cavity is formed in the rotor which cavity opens through one end face of the rotor. Intake means are provided for introducing a charge into the internal cavity of the rotor through the rotor end face. Transfer means withdraw the charge from the internal cavity of the rotor through the one end face and introduce the charge into the chambers upon the relative rotation of the rotor and the outer housing for generating a cooling flow through the rotor upon such relative rotation.

BRIEF DESCRIPTION OF THE DRAWINGS

FIG. 1 is a top plan view of a rotary piston internal combustion engine embodying this invention with certain of the components of the engine removed.

FIG. 2 is a side elevational view of the engine shown in FIG. 1.

FIG. 3 is an enlarged cross-sectional view taken along the line 3—3 of FIG. 2.

FIG. 4 is an enlarged top view of the upper end plate of the engine, with portions broken away, taken generally in the direction of the line 4—4 in FIG. 2.

FIG. 5 is an enlarged cross-sectional view taken along the line 5—5 of FIG. 4.

FIG. 6 is an enlarged cross-sectional view taken along the line 6—6 of FIG. 4.

FIG. 7 is a flat pattern view taken generally along the line 7—7 in FIG. 3 and is on an enlarged scale.

FIG. 8 is an enlarged view of the area encompassed by the circle 8 in FIG. 4 with portions broken away.

FIG. 9 is a cross-sectional view taken along the line 9—9 of FIG. 8.

DETAILED DESCRIPTION OF THE PREFERRED EMBODIMENT

A four cycle internal combustion engine embodying this invention is identified generally by the reference numeral 11 and is depicted in the drawings with certain supporting equipment such as the fuel tank, carburetor and muffler removed for sake of illustration. The engine 11 includes an outer housing assembly 12 in which an output shaft 13 is supported for rotation. The engine 11 is designed so that the output shaft 13 may be disposed vertically, as shown in the drawings, or horizontally. To assist in the vertical mounting, mounting bosses or lugs 14 are formed upon the lower portion of the outer housing assembly 12 and particularly at the base of an oil sump casting, indicated generally by the reference numeral 15. Side mounting bosses 16 are also formed in the outer housing assembly 12 and sump casting 15 so that the engine 11 may be mounted with the output shaft 13 extending in a horizontal direction.

Referring now primarily to FIG. 3, the outer housing assembly 12 includes a central member 20 that is formed with a cavity 17 in which a rotor, indicated generally by the reference numeral 18, is supported. The opposite ends of the cavity 17 are closed by lower and upper end walls 19 and 21, which end walls are affixed to the central member 20 in any known manner. The rotor 18 has a shape which, as will become more apparent as this description proceeds, generally resembles a triangle having apex portions 22, 23 and 24. Apex seals 25, 26 and 27 are carried in complementary grooves formed in the apex portions 22, 23 and 24 and engage the inner surface of the outer housing 12 that defines the cavity 17 to divide the cavity 17 into three chambers 28, 29 and 31. Compression and oil seals 32 and 33 are received in circular grooves formed in opposite faces of the rotor 18 and engage the lower and upper face plates 19 and 21, respectively, to complete the sealing of the chambers 28, 29 and 31.

The rotor 18 is formed with a cylindrical bore 34 that forms a bearing surface which engages a complementary bearing surface 35 formed on an eccentric 36. The eccentric 36 is, in turn, affixed to the output shaft 13 with its surface 35 being eccentrically disposed with respect to the axis of rotation of the output shaft 13. The output shaft 13 is journaled in the top plate 21 and oil sump casting 15, in any known manner.

As is well known with this type of mechanism, timing gears (not shown) are provided to move the rotor 18 relative to the outer housing 12 as these elements undergo relative rotation. These timing gears comprise an internal gear fixed relative to the rotor 18 and an external gear fixed relative to the outer housing assembly 12. The gears may be employed as an oil pump as described in my copending application entitled "Pump for Rotary Machine," Ser. No. 813,891, filed Apr. 7, 1969. During the relative rotation, the rotor apex seals 25, 26 and 27 sweep across the surface 17 of the housing 12 and the volumes of the chambers 28, 29 and 31 alternately increase and decrease in volume.

In this type of mechanism, it has been proposed to embody a generated shape for the cavity 17 with the rotor 18 having an external configuration that constitutes the inner envelope of this generated shape. The use of such geometry is described in the British patent to Millard, No. 583,035, accepted Dec. 5, 1946. The shape of the surface 17 is, however, not a truly generated shape since true shapes are difficult to form. As is noted in the British Millard patent, the shape of the cavity in the outer housing is generated by a point on a line that extends tangentially to an eccentric circle and which revolves around this circle. It has been found that if the ratio of the length or radius of the generating line to the radius of the eccentric circle is approximately equal to 8.5, the generated shape may be closely approximated by an oval shape. Such a configuration, therefore, is incorporated in the disclosed engine.

Referring specifically to FIGS. 4 through 6, the upper end plate 21 is formed with an induction passage 41 which terminates at its outer end in a flange 42 that is adapted to support a carburetor (not shown). The other end of the induction passage 41 terminates at a generally circumferentially extending passage 43 that is formed in part in the uppermost face of the end plate 21. Reinforcing ribs 44 extend across the passage 43 at spaced intervals. The ribs 44 do not extend the full height of the passage 43 so that a full line of gas flow is provided. In addition, a smaller circumferentially extending passage 45 extends through these reinforcing ribs 44 and through the lower face of the upper end plate 21. The passage 45 opens into the cavity 17 in an area between the end seals 32 and 33 of the rotor 18 regardless of the angular position of the rotor 18.

Referring now to FIGS. 3 and 7, the rotor 18 is generally open in the area between the seals 32 and 33 with the outer portion of the rotor 18 being connected to its inner portion by means of a first series of flow directing vanes 46 and a second series of vanes 47. The vanes 46 are disposed at an angle to the upper face plate 21 and terminate at their uppermost end adjacent this plate. The lower ends of the vanes 46 terminate at a spaced distance from the lower end plate 19 so as to permit flow of gases from one side of each of the vanes 46 to the other side. The vanes 47 are disposed at an angle to the lower end plate 19 and terminate at their lower ends adjacent this end plate. The upper ends of the vanes 47 are spaced from the end plate 21 so as to permit flow between these vanes and the top end plate 21. With the rotor 18 rotating in a clockwise direction, as viewed in FIG. 3, which direction is indicated by the arrow 48 in FIG. 7, the induction charge will pass into the hollow interior of the rotor through its substantially open upper end face from the circumferential passage 45 and will be circulated through the rotor along a serpentine path determined by the angular disposition of the vanes 46 and 47 as shown by the flow arrows in FIG. 7.

This flow of induction air through the rotor 18 will assist in the cooling of the rotor 18 and will help dissipate the localized heat generated by the combustion of the gases within the respective chambers 28, 29, and 31 as they pass a spark plug 49 positioned within the central portion 20 of the outer housing assembly 12. Since combustion always occurs in the area of the cavity 17 adjacent the terminals of the spark plug 49, this area is subject to the greatest heat loading. The cooler induction charge will be introduced into the rotor 18 in this area, hence the coolest portions of the gases will be delivered to the area of greatest heat. The vanes 46 and 47, in addition to directing the air flow through the rotor 18, act to transmit the heat from the outer periphery of the rotor into its hollow interior where the heat may be transferred to the intake charge.

Referring again to FIGS. 4 through 6 and additionally to FIGS. 8 and 9, second and third circumferentially extending passages 51 and 52 are formed in the top end plate 21 and extend upwardly from the cavity 17 in an area adjacent the rotor 18 and between its end seals 32 and 33. These passages 51 and 52 permit the induction charge to flow from the hollow interior of the rotor 18 into larger passages 53 and 54 formed in the upper face of the end plate 21. The passages 53 and 54 are separated from the passage 43 adjacent each of its ends by ribs 55 and 56. The ribs 55 and 56 extend the full height of the passages 43, 53 and 54. A gasket (not shown) and a cover plate 57 cover the upper ends of the passages 43, 53 and 54 and assist in the separation of the passage 43 from the passages 53 and 54. The cover plate 57 also completes the definition of the intake passages.

The passages 53 and 54 intersect each other adjacent an upstanding boss 58 upon which a pressure responsive check valve assembly, indicated generally by the reference numeral 59, is supported. The boss 58 extends only partially into the passages 53 and 54 (FIG. 9) so as to permit free communication between these passages.

Referring specifically to FIGS. 8 and 9, the check valve assembly 59 positioned upon the boss 58 is comprised of three reed type check valves 61, 62 and 63. The valves 61, 62 and 63 are each apertured at one end for receipt of dowel pins 64 which serve to locate the check valves 61, 62 and 63. A valve plate 65 is affixed in confronting relationship to the valves 61, 62 and 63 by means of bolts 66 and 67 that extend through elongated slots 68 and 69 formed in the reeds 61 and 63, respectively. The bolts 66 and 67 are tapped into suitably threaded apertures formed in the top end plate 21 and hold the reed valves against a gasket 70. To support the central portion of the valve plate 65, an upstanding boss 71 extends through an elongated opening 72 formed in the reed 62 and engages the underside of the valve plate 65. In addition to passing the bolts 66 and 67 and boss 71, the reed apertures 68, 69 and 72 serve to provide for a control of the rate of the reed valves.

The valve plate 65 is formed with openings 73 in registry with the lower ends of each of the reed valves 61, 62 and 63. The openings 73 have generally the shape of a convergent nozzle as should be evident from an inspection of FIG. 9. The downstream side of the reed valves are exposed to an intake port 75 formed in the boss 58 of the top end plate 21. The port 75 is adapted to sequentially register with the chambers 28, 29 and 31 upon relative rotation of the rotor 18. The end plate 21 is formed with a curved surface 76 adjacent the port 75 and on the underside of the lower ends of the reeds 61, 62 and 63. When one of the chambers 28, 29 and 31 is presented to the intake port 75 and the volume of this chamber is increasing due to the relative rotation of the rotor 18, a decreased pressure or suction will be exerted on the downstream side of the reeds 61, 62 and 63. The higher pressure acting on the upper sides of the reeds 61, 62 and 63 through the openings 73 in the valve plate 65 urges the reeds to an open position as shown in FIG. 9. The curved shape of the surface 76 limits the loading on the reeds 61, 62 and 63 thus insuring long life for these components.

After a charge has been drawn into respective of the chambers 28, 29 and 31 by the chamber volume decreasing due to the relative rotation of the rotor 18 it is fired by the spark plug 49 at the appropriate timing interval. The burnt charge will expand driving the rotor 18 and output shaft 13 in a known manner. After the expansion, the chambers will be sequentially presented to an exhaust port 78 formed in the housing central portion 20. The exhaust port 78 extends through a flange 79 to which a muffler (not shown) may be attached in any known manner. Thus, the burnt charge is discharged to the atmosphere.

As is well known with this type of machine, the movement of the rotor 18 relative to the outer housing assembly 12 causes the intake port 75 to commence opening prior to the time when the exhaust port 78 is fully closed. There is a considerable degree of overlap between this opening; for example in a typical engine constructed in accordance with this invention, the degree of overlap is approximately 60° of rotation of the output shaft 13 or 20° of rotation of the rotor 18 relative to the outer housing assembly 12. Such a high degree of overlap will, in conventional engines of this type, result in back flow of exhaust gases from the chamber that has just expanded to the intake system as this chamber is exposed to the intake port. In order to prevent such back flow, the reeds 61, 62 and 63 will not open until the pressure in the induction system exceeds the pressure in the respective cavity to which the port 75 is open. Thus, during initial opening of the port 75, the high pressure exhaust gases in the respective cavity cannot enter the induction system and will be substantially discharged from the exhaust port 78. In addition to improving the low speed torque, the induction system check valves will somewhat reduce the cooling load since hot exhaust gases are not permitted to flow into the induction system.

The engine 11 is primarily air cooled. In addition to the rotor cooling already described, the upper end plate 21 may be provided with radially extending cooling fins 81 that will help cool this end wall and which will in addition convey the heat that has been transmitted to the induction charge back to the atmosphere. The oil sump casting 15 is also provided with cooling fins 82 as is the central member of the housing assembly 20. As is noted in my aforementioned copending application, the lubricant also assists in the cooling in the manner described in that patent application. That is, the lubricant that contacts certain of the moving parts of the engine will take on the heat from these parts which heat is dissipated to the atmosphere through the sump casting 15 when the lubricant is returned thereto. When the engine 11 is operated as a spark ignition engine, the latent heat of vaporization of the fuel will also assist in the cooling of the rotor 18. Of course, the invention is equally adapted for use in a diesel or compression ignition engine.

While the invention has been described in conjunction with a rotary piston engine in which the outer housing assembly 12 was stationary and the rotor 18 rotated, any of the well known kinematic variations possible with this type of mechanism can be employed. For example, both the outer housing and rotor may rotate or the rotor could be fixed with the outer housing rotating. Such other variations and applications will be obvious to those skilled in the art.

What is claimed is:

1. A cooling arrangement for a rotating piston internal combustion engine comprising an outer housing defining a cavity, a rotor positioned in said cavity, means on said rotor engaging said outer housing for dividing said cavity into at least two chambers, said outer housing and said rotor being supported for relative rotation whereby said chambers vary in volume, said rotor having an internal cavity formed therein opening through one end face thereof, means forming a closure for said rotor internal cavity at its other end face, intake means for introducing a charge into said internal cavity of said rotor through said one rotor end face, means for directing said charge from said one end face toward the other end face of said rotor and within said internal cavity and back to said one end face, and transfer means for withdrawing the charge from said internal cavity of said rotor through said one end face and for introducing the charge into one of said chambers upon the relative rotation of said rotor and said outer housing for generating a cooling flow of the charge through said rotor upon such relative rotation.

2. A cooling arrangement as set forth in claim 1 wherein the outer housing includes at least one end wall juxtaposed to the one end face of the rotor, the intake means comprising a first circumferential passage formed in said end wall, the transfer means comprising a second circumferential passage formed in said end wall and an intake port formed in said end wall in registry with the internal cavity of said outer housing.

3. A cooling arrangement for a rotating piston internal combustion engine comprising an outer housing defining a cavity, a rotor positioned in said cavity, means on said rotor engaging said outer housing for dividing said cavity into at least two chambers, said outer housing and said rotor being supported for relative rotation whereby said chambers vary in volume, said rotor having an internal cavity formed therein opening through one end face thereof, intake means for introducing a charge into said internal cavity of said rotor through said one rotor end face, transfer means for withdrawing the charge from said internal cavity of said rotor through said one end face and for introducing the charge into one of said chambers upon the relative rotation of said rotor and said outer housing for generating a cooling flow of the charge through said rotor upon such relative rotation, and a plurality of vanes extending across the internal cavity of said rotor for transmitting heat to said cavity and for directing the air flow therethrough.

4. A cooling arrangement as set forth in claim 3 wherein the vanes comprise a first set of vanes for directing the air flow from the one end face of the rotor axially toward the other end face of the rotor and a second set of vanes for directing the air flow in the cavity from the other end face back to the one end face.

5. A cooling arrangement as set forth in claim 4 wherein the outer housing includes at least one end wall juxtaposed to the one end face of the rotor, the intake means comprising a first circumferential passage formed in said end wall, the transfer means comprising a second circumferential passage formed in said end wall and an intake port formed in said end wall in registry with the internal cavity of said outer housing.

References Cited

UNITED STATES PATENTS 3,180,323  4/1965  Paschke _____ 123—8(CC)

ALLAN D. HERRMANN, Primary Examiner

U.S. Cl. X.R.

418—61, 101